Patented Mar. 21, 1939

2,151,582

UNITED STATES PATENT OFFICE 2,151,582

STABLE BREWED DECAFFEINIZED COFFEE AND METHOD OF PRODUCING THE SAME

David Julian Block, Winnetka, Ill.

No Drawing. Application December 24, 1934, Serial No. 759,103

7 Claims. (Cl. 99—69)

This invention relates to a decaffeinized coffee which is non-aging, and to a method of producing same.

The invention is a continuation in part of my co-pending application 714,995, filed March 10, 1934.

It is commonly known that beverages such as coffee, tea, cocoa and yerba maté contain alkaloid ingredients such as caffeine which have a distinct physiological effect upon a partaker, and the removal of which improves the potability of the beverage. Various means have been proposed for the decaffeinizing of such beverages, particularly coffee, and some of these are in fairly wide commercial use. All of them however add substantially to the cost of coffee, and none of them are suitable for economical use upon a brewed coffee.

By means of the present invention it is possible to use a prepared cartridge in connection with the domestic preparation of coffee and to discard this cartridge when its effectiveness has ceased.

It has been proposed in British patent, No. 302,332 to use highly active carbon through which brewed coffee is slowly percolated. This process has the disadvantage that highly active carbons are relatively expensive and, at the same time, it is so absorbent that it removes most of the aroma of the coffee. This is recognized in the British patent, and an attempt is there made to overcome it by pre-treating the carbon with smoke from the roasting of coffee.

It has now been discovered that excellent decaffeinization can be obtaind by the use of ordinary charcoal, and that when this is used, no treatment with roast gases is necessary. The coffee so produced has the full aroma of normally brewed coffee, but is free from nearly all of the caffeine, and at the same time tannic and caffetannic acids are largely removed. Normally, as much as 97–98% of the caffeine is taken up by the cartridge.

It is preferred to use a cartridge of carbon containing from 1 to 10%, preferably from 8 to 10% of calcium carbonate in granular form. Chalk is preferred, and it is preferably in the form of granules about the size of rice kernels. Instead of calcium carbonate, magnesium carbonate or other slowly soluble compounds having an alkaline reaction may be used.

The alkaline agents very materially decrease the solubility of the caffeine, and apparently make it possible for the unactivated carbon to decaffeinate the beverage properly.

In my co-pending application No. 716,629 I have described an apparatus which is suitable for domestic use in connection with my process. As shown in that application hot water is percolated through a layer of ground coffee, to produce a coffee brew, and the latter is then rapidly percolated through a layer, preferably in the form of a cartridge, with carbon and alkaline agents. A suitable cartridge for domestic use is approximately 3/4 inch in thickness and a diameter of 4–5 inches or upwards, depending upon the amount of coffee to be brewed. A cartridge 3/4 x 5 inches will normally decaffeinate about five gallons of coffee.

A beverage produced in this manner has the surprising faculty of not deteriorating with age. Whereas normal coffee becomes wholly unfit for use shortly after it is brewed, a beverage produced according to this process may be reheated days or even a week or more after the original brewing and will have the full fresh flavor of newly brewed coffee.

The foregoing detailed description is given for clearness of understanding only, and no unnecessary limitations should be understood therefrom, but the appended claims should be construed as broadly as permissible in view of the prior art.

What I claim as new and desire to secure by Letters Patent, is:

1. The method of treating coffee for substantial decaffeinization thereof which comprises preparing a hot water brew of the coffee and contacting the hot brew with substantially unactivated carbon in the presence of a minor quantity of a slowly soluble non-toxic alkaline substance.

2. The method as set forth in claim 1, in which the alkaline substance is an alkaline earth carbonate.

3. The method as set forth in claim 1, in which the carbon is ordinary charcoal and the alkaline substance is granular chalk.

4. A decaffeinating compound consisting essentially of powdered charcoal and a granular alkaline earth carbonate.

5. A decaffeinating compound consisting essentially of powdered charcoal with 8 to 10% of granular chalk.

6. The method of treating coffee for substantial decaffeinization thereof which comprises preparing a hot water brew of the coffee and contacting the hot brew with substantially unactivated carbon.

7. The method of treating coffee for substantial decaffeinization thereof which comprises preparing a hot water brew of the coffee and contacting the hot brew with substantially unactivated carbon in the presence of a minor quantity of a slowly soluble non-toxic alkaline substance for a period sufficiently long to substantially decaffeinate the coffee without substantially affecting the aromatic qualities thereof.

DAVID JULIAN BLOCK.